United States Patent
Kim et al.

(10) Patent No.: US 7,391,238 B2
(45) Date of Patent: Jun. 24, 2008

(54) SEMICONDUCTOR MEMORY DEVICE HAVING PRE-EMPHASIS SIGNAL GENERATOR

(75) Inventors: Hyun-Jin Kim, Suwon-si (KR); Kwang-Il Park, Yongin-si (KR); Woo-Jin Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 11/429,296

(22) Filed: May 5, 2006

(65) Prior Publication Data
US 2006/0255829 A1 Nov. 16, 2006

(30) Foreign Application Priority Data
May 12, 2005 (KR) .............. 10-2005-0039717
Jan. 9, 2006 (KR) .............. 10-2006-0002380

(51) Int. Cl.
*H03K 19/094* (2006.01)
*H03K 19/0175* (2006.01)

(52) U.S. Cl. ............... 326/83; 326/30; 327/108

(58) Field of Classification Search ............ 326/22, 326/31, 30, 33, 82, 83; 327/108, 109, 112; 330/53, 149; 375/296, 297; 455/63
See application file for complete search history.

(56) References Cited

U.S. PATENT DOCUMENTS 5,448,591 A * 9/1995 Goodrich ............... 375/257

| 6,351,172 | B1 * | 2/2002 | Ouyang et al. | 327/333 |
| 6,674,313 | B2 | 1/2004 | Kurisu et al. | 327/108 |
| 6,759,868 | B2 | 7/2004 | Helt et al. | 326/30 |
| 6,847,567 | B2 * | 1/2005 | Kang | 365/205 |
| 6,940,302 | B1 * | 9/2005 | Shumarayev et al. | 326/26 |
| 7,164,299 | B2 * | 1/2007 | Nedachi | 327/112 |
| 2002/0190746 | A1 * | 12/2002 | Abrosimov et al. | 326/30 |
| 2005/0280435 | A1 * | 12/2005 | Srivastava et al. | 326/30 |

FOREIGN PATENT DOCUMENTS

JP 10-075167 3/1998

* cited by examiner

*Primary Examiner*—Rexford Barnie
*Assistant Examiner*—Crystal L Hammond
(74) *Attorney, Agent, or Firm*—F. Chau & Associates, LLC

(57) ABSTRACT

A semiconductor memory device includes a primary output driver which outputs a data signal through an output terminal; a secondary output driver which is connected to the output terminal and performs a pre-emphasis operation; and a pre-emphasis signal generator which outputs a pre-emphasis signal to enable the secondary output driver The pre-emphasis signal generator includes a auto pulse generator which generates an auto pulse in response to a transition of a control signal; a delay circuit which receives the auto pulse output from the auto pulse generator, delays the auto pulse by a predetermined period, and outputs a pre-emphasis signal; and a delay control unit which applies a delay control signal to the delay circuit and controls a delay amount of the delay circuit.

22 Claims, 4 Drawing Sheets

SEMICONDUCTOR MEMORY DEVICE HAVING PRE-EMPHASIS SIGNAL GENERATOR

CROSS-REFERENCE TO RELATED PATENT APPLICATION

This application claims priority to Korean Patent Application Nos. 2005-0039717, filed on May 12, 2005 and 2006-0002380, filed on Jan. 9, 2006, in the Korean Intellectual Property Office, the disclosure of which is incorporated by reference herein.

BACKGROUND OF THE INVENTION

1. Field of the Invention

The present invention relates to a semiconductor memory device, and more particularly, to a semiconductor memory device which can efficiently remove noise due to signal reflection.

2. Description of the Related Art

A semiconductor memory device such as a dynamic random access memory (DRAM) includes an output driver for driving data generated within the memory to another device external to the memory.

FIG. 1 illustrates an output driver of a memory device. As shown in FIG. 1, the output driver includes an inverter 1, a NAND gate 2, a NOR gate 3, a PMOS transistor MP, and an NMOS transistor MN.

The PMOS transistor MP is connected to a power supply voltage $V_{DD}$ and the NMOS transistor MN is connected to a ground voltage $V_{SS}$. In addition, the PMOS transistor MP and the NMOS transistor MN are connected to each other, and a node a between the PMOS transistor MP and the NMOS transistor MN is connected to an output terminal 4.

The output driver is generally enabled in response to an enable signal OEB having a low level and supplies sourcing current to a load capacitor (not shown) of the output terminal 4 through the PMOS transistor MP used as a pull-up transistor to charge the load capacitor when an input data D is high. In addition, when the input data D is low, the output driver supplies sinking current to the load capacitor to discharge the load capacitor of the output terminal 4 through the NMOS transistor MN used as a pull-down transistor, thereby lowering the potential of the output terminal 4.

When a semiconductor memory device is operated at higher speed, noise in an interface between a memory controller and a memory core module reduces a timing margin and therefore needs to be minimized. In a dual-rank or a multi-rank DRAM, there are more parasitic components and there are more noise as compared with a single-rank DRAM.

Another source of noise is signal reflection due to impedance mismatch. When the signal reflection is large, the inter-symbol interference (ISI) degrades the integrity of the data output signal.

In order to prevent this phenomenon, the data output signal is pre-emphasized. U.S. Pat. No. 6,759,868 and Japanese Unexamined Application Publication No. 2002-094365 disclose an output driver having a pre-emphasis function.

FIG. 2 illustrates a conventional semiconductor memory device including a pre-emphasis function. As shown in FIG. 2, the conventional semiconductor memory device includes a primary output driver having a first PMOS transistor MP1 and a first NMOS transistor MN1. In addition, the conventional semiconductor memory device further includes a secondary output driver for performing a pre-emphasis operation on a data signal output from the primary output driver. The secondary output driver includes a second PMOS transistor MP2 and a second NMOS transistor MN2.

The primary output driver and the secondary output driver are connected to a transmission line L through an output terminal and output a data signal. One end of the transmission line L may be connected to one side of a termination resistor $R_T$. The other end of the resistor $R_T$ is electrically connected to a power supply voltage $V_{DD}$.

Signal waveforms shown in FIG. 2 represent control signals applied for driving the primary output driver and the secondary output driver. The PMOS transistors MP1 and MP2 of the primary output driver and the secondary output driver are turned on by a control signal having a low level and the NMOS transistors MN1 and MN2 thereof are turned on by a control signal having a high level.

The pre-emphasis operation is performed by turning on the PMOS transistor MP2 or the NMOS transistor MN2 of the secondary output driver for a short time when the PMOS transistor MP1 or the NMOS transistor MN1 of the primary output driver is turned on. Since the pre-emphasis operation is performed to increase the voltage level of the data output signal, it better compensates the signal when it is attenuated due to the signal reflection phenomenon and reduces errors from being generated when the signal is restored.

The pre-emphasis operation is performed on the data signals having a low level and a high level. However, when the semiconductor memory device outputs the data signal, skew may be present when the data signal transitions between the low level and the high level due to a difference between components.

However, in the conventional device, the pre-emphasis operation is performed when the primary output driver is turned on, but not when the signal reflection phenomenon is occurring. If the pre-emphasis operation is not performed when the signal is reflected and attenuated in a transmission line, an attenuated signal cannot be adequately compensated. With the signal reflection, an aperture window is reduced and a safe timing margin with which to reliably operate is reduced.

SUMMARY OF THE INVENTION

According to an exemplary embodiment of the present invention, there is provided a semiconductor memory device which includes a primary output driver, a secondary output driver, and a pre-emphasis signal generator. The pre-emphasis signal generator includes an auto pulse generator, a delay circuit, and a delay control unit. The primary output driver outputs a data signal through an output terminal. The secondary output driver is connected to the output terminal and performs a pre-emphasis operation. The pre-emphasis signal generator outputs a pre-emphasis signal to activate the secondary output driver. The auto pulse generator generates an auto pulse in response to a transition of a control signal. The delay circuit receives the auto pulse output from the auto pulse generator, delays the auto pulse by a predetermined period, and outputs a pre-emphasis signal. The delay control unit applies a delay control signal to the delay circuit and controls a delay amount of the delay circuit.

The first control signal may be identical to a read data signal input to the primary output driver.

The delay control unit may delay the auto pulse by an amount of time the data signal is reflected back to the output terminal.

The delay control unit may include a mode register set (MRS).

The secondary output driver may include a PMOS transistor and an NMOS transistor. The PMOS transistor may be connected to a power supply voltage and the NMOS transistor may be connected to a ground voltage. In addition, the PMOS transistor and the NMOS transistor may be commonly connected to the output terminal. The pre-emphasis signal may be applied to a gate electrode of the NMOS transistor such that the pre-emphasis operation is performed on a data signal having a low level.

According to another exemplary embodiment of the present invention, there is provided a semiconductor memory device which includes a primary output driver, a secondary output driver, and a pre-emphasis signal generator. The pre-emphasis signal generator includes a plurality of auto pulse generators, a plurality of delay circuits, and a delay control unit. The primary output driver outputs a data signal through an output terminal. The secondary output driver is connected to the output terminal and performs a pre-emphasis operation. The pre-emphasis signal generator outputs a pre-emphasis signal to activate the secondary output driver. Each of the plurality of auto pulse generators generate an auto pulse in response to a transition of a corresponding control signal. Each of the plurality of delay circuits receive the auto pulse output from a corresponding one of the auto pulse generators, delays the auto pulse by a predetermined period, and outputs the corresponding pre-emphasis signal. The delay control unit applies each of a plurality of delay control signals to a corresponding one of the delay circuits and controls a delay amount of the corresponding one of the delay circuits.

The pre-emphasis signal generator may include a first auto pulse generator, a second auto pulse generator, a first delay circuit and a second delay circuit. The first auto pulse generator generates a first auto pulse in response to a transition of a first control signal. The first delay circuit receives the first auto pulse output from the first auto pulse generator, delays the first auto pulse by a predetermined period, and outputs a first pre-emphasis signal. The second auto pulse generator generates a second auto pulse in response to a transition of a second control signal. The second delay circuit receives the second auto pulse output from the second auto pulse generator, delays the second auto pulse by a predetermined period, and outputs a second pre-emphasis signal.

The first control signal may be identical a read data signal input to the primary output driver, and the second control signal may be generated by inverting the first control signal.

The secondary output driver may include a PMOS transistor and an NMOS transistor. The PMOS transistor may be connected to a power supply voltage and the NMOS transistor may be connected to a ground voltage. In addition, the PMOS transistor and the NMOS transistor may be commonly connected to an output terminal, wherein the first pre-emphasis signal may be applied to a gate electrode of the NMOS transistor such that the pre-emphasis operation is performed on a data signal having a low level and the second pre-emphasis signal may be applied to a gate electrode of the PMOS transistor such that the pre-emphasis operation is performed on a data signal having a high level.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS

Figure 1:
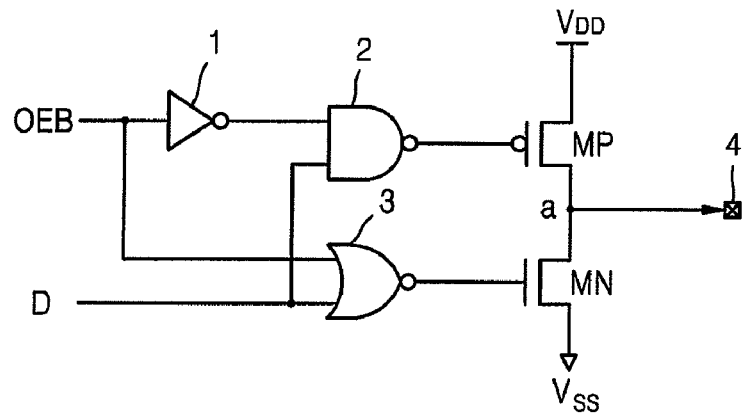
FIG. 1 illustrates an output driver of a memory device.
Figure 2:
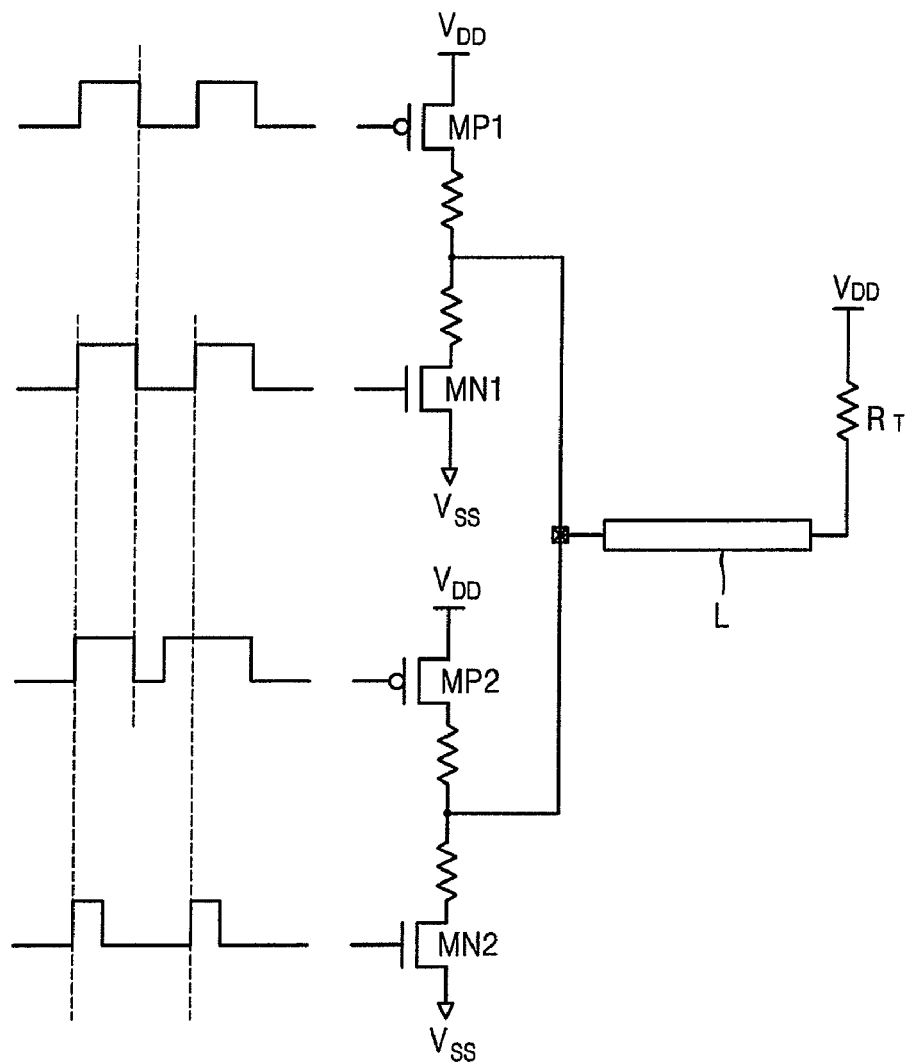
FIG. 2 illustrates a conventional semiconductor memory device including a pre-emphasis function.

Hereinafter, exemplary embodiments of the present invention will be described in detail with reference to the attached drawings. Like reference numerals in the drawings denote like elements.

Figure 3:
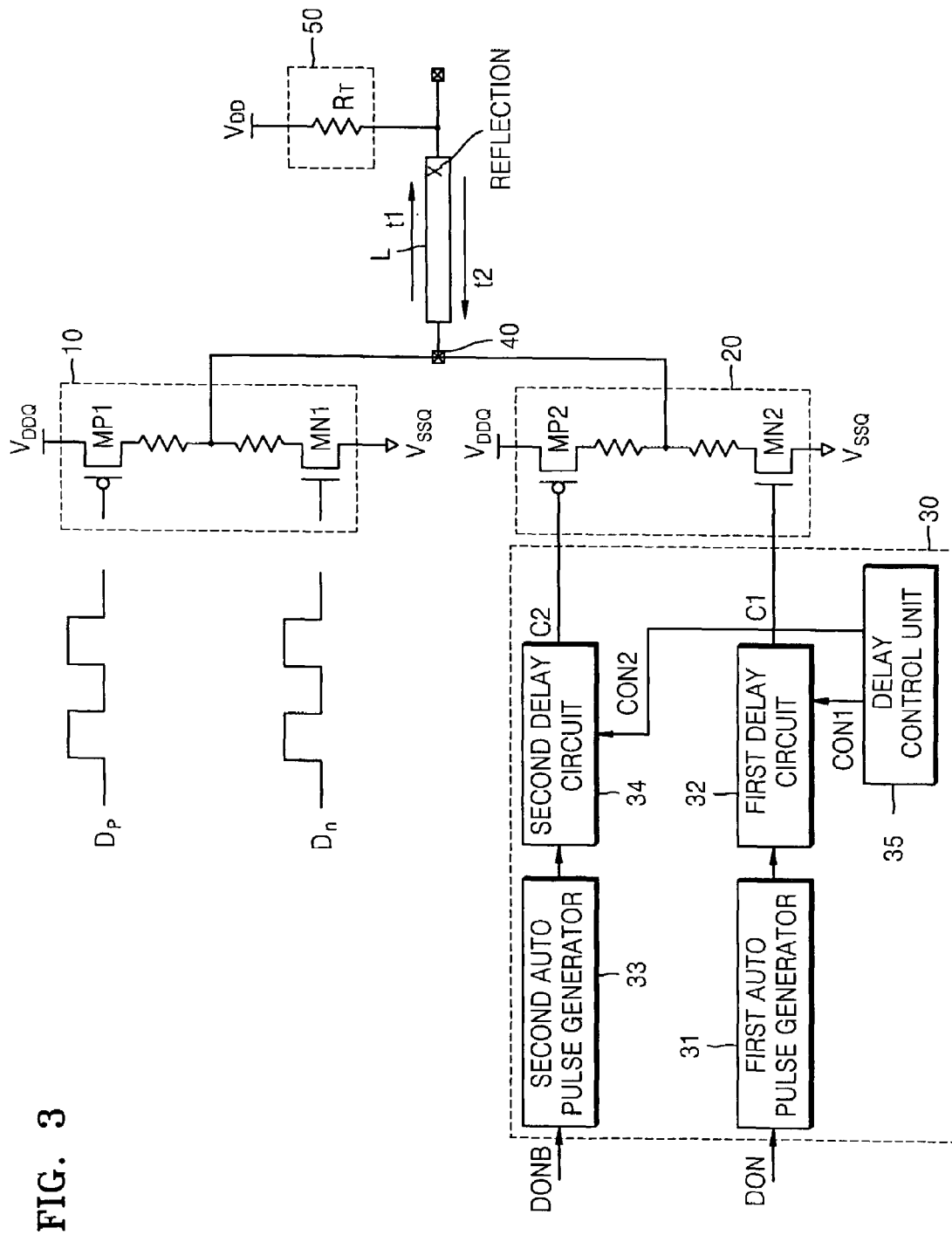
FIG. 3 illustrates a semiconductor memory device according to an exemplary embodiment of the present invention.

FIG. 3 illustrates a semiconductor memory device according to an exemplary embodiment of the present invention. For convenience sake, a transmission line L connected to an output terminal 40 of the semiconductor memory device and a termination resistor $R_T$ connected to the transmission line L are shown together.

As shown in FIG. 3, a semiconductor memory device according to an exemplary embodiment of the invention includes a primary output driver 10 for outputting data, and a secondary output driver 20 for performing a pre-emphasis operation. The primary output driver 10 includes a first PMOS transistor MP1 which is electrically connected to a power supply voltage $V_{DDQ}$ and a first NMOS transistor MN1 which is electrically connected to a ground voltage $V_{SSQ}$. In addition, the first PMOS transistor MP1 and the first NMOS transistor MN1 are connected to each other, and a node between the first PMOS transistor MP1 and the first NMOS transistor MN1 is electrically connected to the output terminal 40. A data signal output from the primary output driver 10 is delivered to the transmission line L through the output terminal 40.

The secondary output driver 20 includes a second PMOS transistor MP2 which is electrically connected to the power supply voltage $V_{DDQ}$ and a second NMOS transistor MN2 which is electrically connected to the ground voltage $V_{SSQ}$. In addition, the second PMOS transistor MP2 and the second NMOS transistor MN2 are connected to each other, and a node between the second PMOS transistor MP2 and the second NMOS transistor MN2 is electrically connected to the output terminal 40. When the primary output driver 10 outputs the data signal through the output terminal 40, the pre-emphasis operation is performed at a predetermined time to improve slew rate characteristics of the data signal delivered through the transmission line L.

The secondary output driver 20 is driven such that the pre-emphasis operation is performed. Accordingly, a semiconductor memory device according to an exemplary embodiment of the present invention further includes a pre-emphasis signal generator 30 for outputting a pre-emphasis signal to drive the secondary output driver 20.

When transmitting the data signal output from the primary output driver 10, the secondary output driver 20 performs the pre-emphasis operation after a predetermined delay time from when a first PMOS transistor MP1 is turned on, thereby efficiently removing noise generated by signal reflection. Alternatively, the pre-emphasis operation may be performed after a predetermined delay time from when a first NMOS transistor MN1 is turned on. Preferably, the pre-emphasis operation may be performed after a delay time obtained by adding a time t1 when the data signal is reflected in the transmission line L, and a time t2 when the data signal is reflected back to the output terminal 40.

The pre-emphasis signal generator 30 includes a first auto pulse generator 31 and a first delay circuit 32. The first auto pulse generator 31 receives a predetermined control signal DON and generates a first auto pulse. The control signal DON may be identical to a read data signal Dn or Dp. That is, the read data signal Dn or Dp input to the primary output driver 10 may be input to the first auto pulse generator 31. The read data signals Dp and Dn are input to the first PMOS transistor MP1 and the first NMOS transistor MN1 of the primary output driver 10, respectively. The read data signals Dp and Dn may be the same signal.

The first auto pulse generator 31 generates a first auto pulse having a high pulse width in response to a rising edge of the read data signal DON. The first auto pulse generated at the first auto pulse generator 31 is delayed by a predetermined period and is applied to a gate electrode of the second NMOS transistor MN2 to turn on the second NMOS transistor MN2. The high pulse width of the first auto pulse is preferably less than that of the read data signal DON.

The first auto pulse generated at the first auto pulse generator 31 is applied to the first delay circuit 32. The first delay circuit 32 delays the first auto pulse and outputs a first pre-emphasis signal C1. The first auto pulse is delayed by the time t1+t2 while the data signal is reflected in the transmission line L and when the data signal is reflected back to the output terminal 40.

The pre-emphasis operation is performed by turning on the second NMOS transistor MN2 during a high level period of the first pre-emphasis signal C1 output from the first delay circuit 32 when the primary output driver 10 outputs the data signal having a low level.

In a semiconductor memory device according to an exemplary embodiment of the present invention, the output terminal 40 is connected to one end of the transmission line L, and the other end of the transmission line L is connected to one end of the termination resistor $R_T$ (50). The other end of the termination resistor 50 is electrically connected to a power supply voltage $V_{DD}$.

When the data signal having a low level is output by driving the first NMOS transistor MN1 in the primary output driver 10, a signal reflection phenomenon is increased. However, even when the data signal having a high level is output, the pre-emphasis operation is performed such that a slew rate is improved and an aperture window becomes wider, thereby enlarging a timing margin with which to reliably operate.

Accordingly, in the semiconductor memory device according to a present exemplary embodiment of the invention, it is preferable that the pre-emphasis signal generator 30 further include a second auto pulse generator 33 and a second delay circuit 34.

The second auto pulse generator 33 receives an inverted read data signal DONB obtained by inverting the read data signal DON and generates a second auto pulse having a low pulse width in response to a rising edge of the inverted read data signal DONB. The second auto pulse generated at the second auto pulse generator 33 is delayed by a predetermined period, and is applied to a gate electrode of the second PMOS transistor MP2 to turn on the second PMOS transistor MP2 during a low level period.

The second auto pulse generated at the second auto pulse generator 33 is input to the second delay circuit 34. The second delay circuit 34 delays the second auto pulse and outputs a second pre-emphasis signal C2. The second auto pulse is delayed by the time the data signal is reflected in the transmission line L and is reflected back to the output terminal 40.

The pre-emphasis operation is performed by turning on the second PMOS transistor MP2 during the low level period of the second pre-emphasis signal C2 output from the second delay circuit 34 when the primary output driver 10 outputs the data signal having a high level.

The first delay circuit 32 and the second delay circuit 34 delay the first and the second auto pulse, respectively, such that the pre-emphasis operation is performed in consideration of time when the data signal is reflected in the transmission line L. Accordingly, the pre-emphasis signal generator 30, which applies to a semiconductor memory device according to an exemplary embodiment of the invention, further includes a delay control unit 35 for controlling a delay amount of the first delay circuit 32 and the second delay circuit 34. The delay control unit 35 outputs a first delay control signal CON1 to the first delay circuit 32 and outputs a second delay control signal CON2 to the second delay circuit 34.

The delay control unit 35 may be embodied in various forms. In one exemplary embodiment, the delay control unit 35 may include a mode register set (MRS). The MRS may be used in a semiconductor memory device program to store a control data for controlling various operation modes of a memory device. In this exemplary embodiment, a delay control signal is the control data applied from the MRS.

Alternatively, the delay control unit 35 may include a fuse option unit. The delay amount of the delay circuit can be controlled depending on whether a fuse included in the fuse option unit is cut or not.

The delay control unit 35, controls the delay amount of the delay circuit for the time while the data signal is reflected in the transmission line L and is reflected back to the output terminal 40. The delay amount may be measured by analyzing a data output waveform through channel simulation in a test mode.

Figure 4:
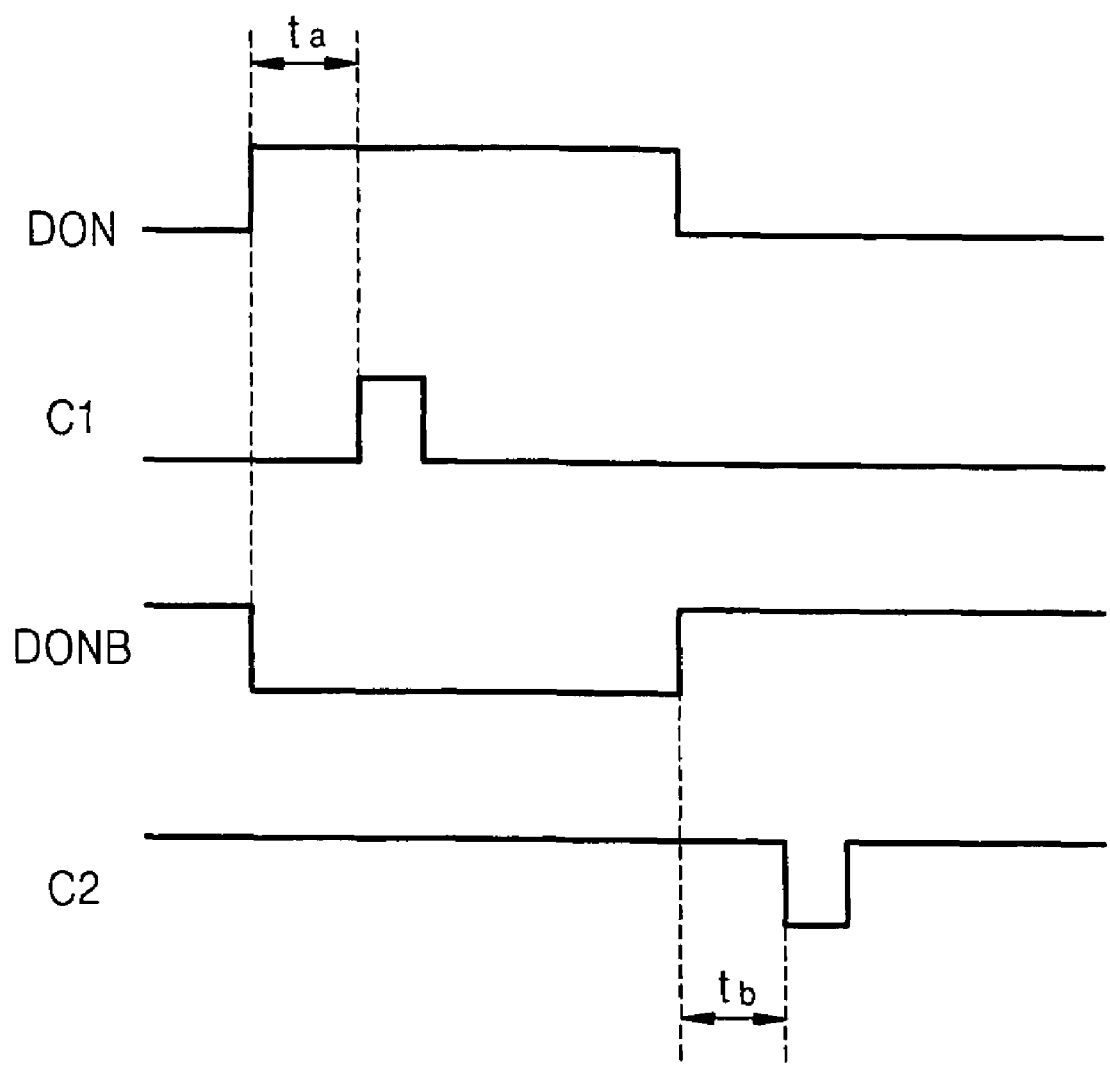
FIG. 4 is a waveform diagram illustrating characteristics of an exemplary pre-emphasis operation in a semiconductor memory device according to an exemplary embodiment of the present invention.

FIG. 4 is a waveform diagram illustrating characteristics of an exemplary pre-emphasis operation in a semiconductor memory device according to an exemplary embodiment of the present invention. In FIG. 4, the read data signal DON, the inverted read data signal DONB, the first pre-emphasis signal C1, and the second pre-emphasis signal C2 are shown.

Referring back to FIG. 3, The first auto pulse generator 31 receives the read data signal DON and generates the first auto pulse having the high pulse width in response to the rising edge of the read data signal DON.

The first delay circuit 32 receives the first auto pulse, delays the first auto pulse by a predetermined period according to the first delay control signal CON1 output from the delay control unit 35, and outputs the first pre-emphasis signal C1, which is input to the gate electrode of the second NMOS transistor MN2 of the secondary output driver 20.

As shown in FIG. 4, the first pre-emphasis signal C1 is generated by delaying the read data signal DON by a delay amount ta. If the time when the data signal having the low level is reflected is t1 and the time when the data signal is reflected back to the output terminal 40 is t2, the delay amount ta becomes t1+t2. Thus, since the aperture window reduced by signal reflection can be adequately compensated, a safe timing margin can be established.

Referring back to FIG. 3, the second auto pulse generator 33 receives the inverted read data signal DONB and generates the second auto pulse having the low pulse width in response to the rising edge of the inverted read data signal DONB.

The second delay circuit 34 receives the second auto pulse, delays the second auto pulse by a predetermined period according to the second delay control signal CON2 output from the delay control unit 35, and outputs the second pre-emphasis signal C2, which is input to the gate electrode of the second PMOS transistor MP2 of the secondary output driver 20.

As shown in FIG. 4, the second pre-emphasis signal C2 is generated by delaying the read data signal DONB by a delay amount tb. If the time when the data signal having the high level is reflected is t3 and the time when the data signal is reflected back to the output terminal 40 is t4, the delay amount tb becomes t3+t4. In this exemplary embodiment, the timing margin can be adequately established.

Figure 5A:
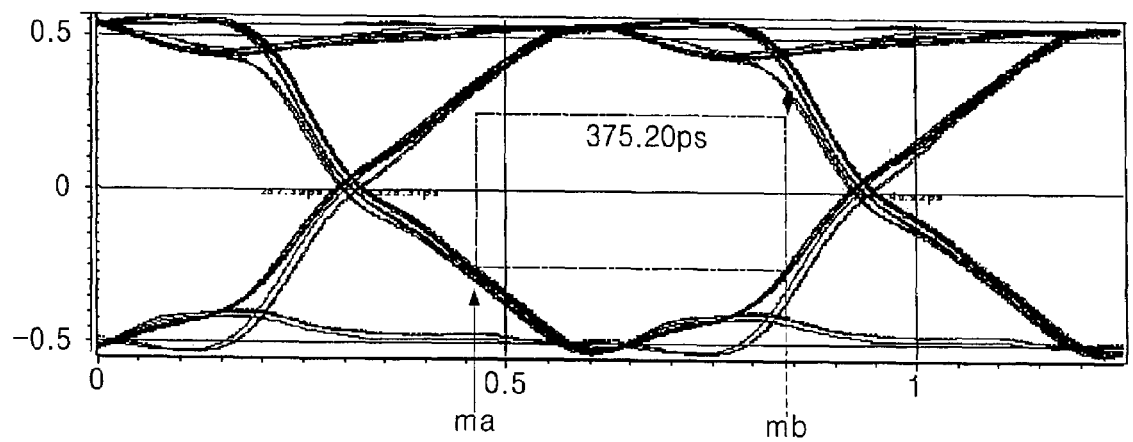
FIGS. 5A and 5B are graphs illustrating a comparison between an aperture window of the semiconductor memory device according to an exemplary embodiment of the present invention and an aperture window of a conventional semiconductor memory device.
Figure 5B:
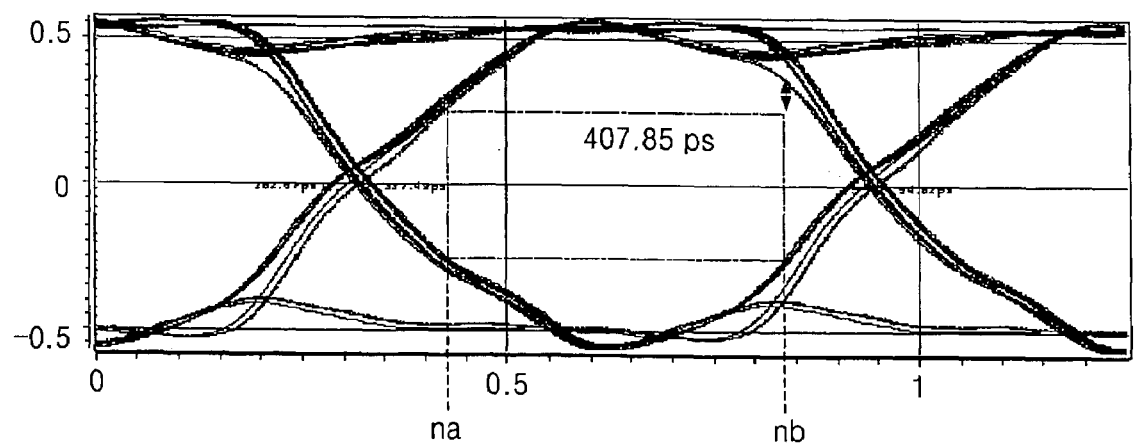

FIGS. 5A and 5B are graphs illustrating a comparison between an aperture window of the semiconductor memory device according to an exemplary embodiment of the present invention and an aperture window of a conventional semiconductor memory device. FIG. 5A illustrates the aperture window in the conventional semiconductor memory device. In FIG. 5A, a horizontal axis represents a time and a vertical axis represents a voltage value of a data signal, which is calculated using a reference voltage Vref of 0 V. In this graph, a data signal having a high level is +0.54 V and a data signal having a low level is −0.54 V. A standard in measuring an aperture window may vary depending on design. In this graph, the standard is 0.25 V in consideration of the reference voltage Vref.

As shown in FIG. 5A, in the conventional semiconductor memory device, a limit appears at time ma and time mb. Accordingly, the aperture window is about 375 ps and a timing margin is obtained by subtracting jitter and skew due to noise from a value of the aperture window. When the timing margin is not adequate, operations may fail and performance will deteriorate. .

In FIG. 5A, a data output property deteriorates at the time ma due to the signal reflection. As mentioned above, when the pre-emphasis operation is performed at the time ma (t1+t2 in FIG. 3) the data output property can be improved.

FIG. 5B illustrates an aperture window in a semiconductor memory device according to an exemplary embodiment of the present invention. In FIG. 5B, a horizontal axis represents a time and a vertical axis represents a voltage value of a data signal. FIG. 5B illustrates an improved aperture window created by performing the pre-emphasis operation when the data signal is reflected.

As shown in FIG. 5B, in a semiconductor memory device according to an exemplary embodiment of the invention, an aperture window at time na and time nb is 407 ps, which is larger than the aperture window of the conventional semiconductor memory device by about 32 ps. When the aperture window is widened, performance can be improved when a data input/output operation of the memory is performed, and more particularly, when the memory operates at a high speed.

In a semiconductor memory device using a plurality of memories, such as a dual-rank or multi-rank DRAM, it is more difficult to establish the timing margin, compared with a single-rank DRAM. This is because a multi-rank DRAM has more parasitic components which increase noise. Accordingly, an exemplary embodiment of the present invention is more effective in a semiconductor memory device having a multi-rank structure.

According to an exemplary embodiment of the present invention, since a pre-emphasis operation is performed when a data signal is actually reflected, noise due to a signal reflection can be removed and a safe timing margin can be more easily achieved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A semiconductor memory device comprising:
   a primary output driver which outputs a data signal through an output terminal;
   a secondary output driver which is connected to the output terminal and performs a pre-emphasis operation; and
   a pre-emphasis signal generator which outputs a pre-emphasis signal to activate the secondary output driver;
   wherein the pre-emphasis signal generator comprises:
   an auto pulse generator which generates an auto pulse in response to a transition of a control signal;
   a delay circuit which receives the auto pulse output from the auto pulse generator, delays the auto pulse by a predetermined period, and outputs the pre-emphasis signal to delay a start of the pre-emphasis operation by the predetermined period; and
   a delay control unit which applies a delay control signal to the delay circuit to control the predetermined period.

2. The semiconductor memory device of claim 1, wherein control signal has the same amplitude, frequency, and pulse width as a read data signal input to the primary output driver.

3. The semiconductor memory device of claim 1, wherein the delay control unit delays the auto pulse an amount of time the data signal is reflected back to the output terminal.

4. The semiconductor memory device of claim 1, wherein the delay control unit comprises a mode register set (MRS).

5. The semiconductor memory device of claim 1, wherein the delay control unit comprises a fuse option unit.

6. The semiconductor memory device of claim 1, wherein the secondary output driver comprises a PMOS transistor and an NMOS transistor,
   wherein the PMOS transistor is connected to a power supply voltage, the NMOS transistor is connected to a ground voltage, and the PMOS transistor and the NMOS transistor are commonly connected to the output terminal, and
   wherein the pre-emphasis signal is applied to a gate electrode of the NMOS transistor such that the pre-emphasis operation is performed on the data signal having a low level.

7. The semiconductor memory device of claim 6, wherein the auto pulse generator generates the auto pulse in response to a rising transition of the control signal.

8. The semiconductor memory device of claim 7, wherein the auto pulse has a high-level voltage for switching the NMOS transistor.

9. The semiconductor memory device of claim 1, wherein the semiconductor memory device has a dual-rank or a multi-rank structure.

10. A semiconductor memory device comprising:
    a primary output driver which outputs a data signal through an output terminal;
    a secondary output driver which is connected to the output terminal and performs pre-emphasis operations; and
    a pre-emphasis signal generator which outputs pre-emphasis signals to activate the secondary output driver;
    wherein the pre-emphasis signal generator comprises:
    a plurality of auto pulse generators that each generate a respective auto pulse in response to a transition of a respective control signal;
    a plurality of delay circuits that each receive the respective auto pulse output from each respective auto pulse generator, delays the respective auto pulse by a predetermined period, and outputs the respective pre-emphasis signal to delay a start of the corresponding pre-emphasis operation by the corresponding predetermined period; and a delay control unit which applies each of a plurality of delay control signals to each of the respective delay circuits to control the corresponding predetermined periods.

11. The semiconductor memory device of claim 10, wherein the pre-emphasis signal generator comprises:
a first auto pulse generator which generates a first auto pulse in response to transition of a first control signal;
a first delay circuit which receives the first auto pulse output from the first auto pulse generator, delays the first auto pulse by a predetermined period, and outputs a first pre-emphasis signal;
a second auto pulse generator which generates a second auto pulse in response to a transition of a second control signal; and
a second delay circuit which receives the second auto pulse output from the first auto pulse generator, delays the second auto pulse by a predetermined period, and outputs a second pre-emphasis signal.

12. The semiconductor memory device of claim 11, wherein the first control signal has the same amplitude, frequency, and pulse width as a read data signal input to the primary output driver.

13. The semiconductor memory device of claim 12, wherein the second control signal is generated by inverting the first control signal.

14. The semiconductor memory device of claim 13, wherein the delay control unit delays the first auto pulse and the second auto pulse by an amount of time the data signal is reflected back to the output terminal.

15. The semiconductor memory device of claim 10, wherein the delay control unit comprises a mode register set (MRS).

16. The semiconductor memory device of claim 10, wherein the delay control unit comprises a fuse option unit.

17. The semiconductor memory device of claim 11, wherein the secondary output driver comprises a PMOS transistor and an NMOS transistor,
wherein the PMOS transistor is connected to a power supply voltage, the NMOS transistor is connected to a ground voltage, and the PMOS transistor and the NMOS transistor are commonly connected to the output terminal,
wherein the first pre-emphasis signal is applied to a gate electrode of the NMOS transistor such that the pre-emphasis operation is performed on a data signal having a low level and the second pre-emphasis signal is applied to a gate electrode of the PMOS transistor such that the pre-emphasis operation is performed on the data signal having a high level.

18. The semiconductor memory device of claim 17, wherein the first auto pulse generator generates the first auto pulse in response to a rising transition of the first control signal.

19. The semiconductor memory device of claim 18, wherein the first auto pulse has a high-level voltage for switching the NMOS transistor.

20. The semiconductor memory device of claim 17, wherein the second auto pulse generator generates the second auto pulse in response to a rising transition of the second control signal.

21. The semiconductor memory device of claim 20, wherein the second auto pulse has a low-level voltage for switching the PMOS transistor.

22. The semiconductor memory device of claim 10, wherein the semiconductor memory device has a dual-rank or multi-rank structure.

* * * * *